(12) United States Patent
S P et al.

(10) Patent No.: US 8,259,585 B1
(45) Date of Patent: Sep. 4, 2012

(54) DYNAMIC LINK LOAD BALANCING

(75) Inventors: Arun Kumar S P, Bangalore (IN); Mukul Golash, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 669 days.

(21) Appl. No.: 12/425,517

(22) Filed: Apr. 17, 2009

(51) Int. Cl.
*H04L 12/26* (2006.01)

(52) U.S. Cl. .................................................. 370/237

(58) Field of Classification Search .................... 370/237
See application file for complete search history.

(56) References Cited

U.S. PATENT DOCUMENTS

| | | | |
|---|---|---|---|
| 6,091,725 A | 7/2000 | Cheriton et al. | |
| 6,118,760 A | 9/2000 | Zaumen et al. | |
| 6,243,667 B1 | 6/2001 | Kerr et al. | |
| 6,553,005 B1 | 4/2003 | Skirmont et al. | |
| 6,651,099 B1 | 11/2003 | Dietz et al. | |
| 6,909,713 B2 | 6/2005 | Magnussen et al. | |
| 6,980,550 B1 | 12/2005 | Yip et al. | |
| 7,206,861 B1 | 4/2007 | Callon | |
| 7,277,386 B1 | 10/2007 | Ferguson et al. | |
| 7,633,871 B1 | 12/2009 | Callon | |
| 7,808,898 B2 * | 10/2010 | Eswaran et al. | 370/230 |
| 2001/0043585 A1 | 11/2001 | Hummel | |
| 2003/0231628 A1 * | 12/2003 | Harada et al. | 370/389 |
| 2004/0013113 A1 | 1/2004 | Singh et al. | |
| 2004/0258073 A1 | 12/2004 | Alexander et al. | |
| 2005/0160171 A1 | 7/2005 | Rabie et al. | |
| 2006/0098587 A1 | 5/2006 | Vasseur et al. | |
| 2006/0182035 A1 | 8/2006 | Vasseur | |
| 2007/0109015 A1 * | 5/2007 | Hanes et al. | 326/38 |
| 2007/0248084 A1 * | 10/2007 | Whitehead | 370/389 |
| 2008/0126565 A1 * | 5/2008 | Osano et al. | 709/242 |
| 2008/0219258 A1 * | 9/2008 | Bowen et al. | 370/389 |
| 2009/0135841 A1 | 5/2009 | Vasseur et al. | |
| 2010/0024008 A1 * | 1/2010 | Hopen et al. | 726/4 |

OTHER PUBLICATIONS

Viswanathan et al., "Evolution of Multiprotocol Label Switching," IEEE, May 1998, pp. 165-173.
U.S. Appl. No. 12/507,200, filed Jul. 22, 2009, entitled, "Load Balancing Network Traffic on a Label Switched Path Using Resource Reservation Protocol With Traffic Engineering," to Kompella.
U.S. Appl. No. 11/677,317, filed Feb. 21, 2007, entitled, "Network Traffic Distribution Across Parallel Paths," to Callon.
Extended European Search Report from European application No. EP 10151477, dated Apr. 12, 2010, 5 pp.

* cited by examiner

*Primary Examiner* — Anh-Vu Ly
*Assistant Examiner* — Christopher R Crompton
(74) *Attorney, Agent, or Firm* — Shumaker & Sieffert, P.A.

(57) ABSTRACT

Techniques are described for load balancing packet flows across parallel data paths. For example, a network device includes a plurality of parallel network interfaces and a control unit that applies each of a first set of hash functions to a packet and one of a second set of hash functions to the packet. Bins of each of the first set of hash functions are mapped to bits of a bit vector. Bins of each of the second set of hash functions are mapped to the plurality of parallel network interfaces. The control unit selects the one of the second set of hash functions to apply to the packet based on values of the bits of the bit vector. The control unit forwards the packet through the network interface that is identified by applying the selected one of the second set of hash functions to the packet.

20 Claims, 10 Drawing Sheets

DYNAMIC LINK LOAD BALANCING

TECHNICAL FIELD

This disclosure relates to computer networks and, more particularly, to distribution of traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Computer networks may have parallel data paths. For example, a network may have a number of interconnected intermediate devices that provide connectivity from an inbound edge router to an outbound edge router. Similarly, a communication device within a computer network may have multiple internal data paths. For example, two network routers may be connected by multiple Ethernet links. Similarly, multiple physical interconnects may couple other devices, e.g., two switches, a switch and a server, two routers, a switch and an end user station, and the like. As a result, some of the packets traveling between two network devices may make use of one path, while other packets traveling between the same two network devices may make use of one or more alternate paths.

The sequence in which a device receives the packets may be important. For instance, a device may need to receive the packets in the sequence the source device sent the packets. Example applications that require in-sequence delivery include support of the Asynchronous Transfer Mode (ATM) over router networks, link emulation using the Internet Protocol (IP) or the Multiprotocol Label Switching (MPLS) protocol, and High-Level Data Link Control (HDLC) over IP or MPLS. Traffic may arrive out of order if packets belonging to the same packet flow are communicated using alternate paths. Further, the traffic may not be distributed evenly among the paths, which may result in congestion on one data path and unused bandwidth on another. This may decrease the efficiency of the network and increase packet latency.

Conventional techniques for load balancing across parallel data paths can generally be classified in one of two categories: per-packet load balancing and per-packet flow load balancing. In the first category, the methods load balance individual packets, i.e., send packets of the same flow over different links to balance the bandwidth consumed from the different physical links. These methods run a risk of delivering packets of a packet flow out of order. For example, one per-packet distribution method includes deterministically rotating among the parallel data paths when transmitting packets, e.g., sending packets along different ones of the parallel data paths in a round-robin fashion. Although this method balances loads across the data paths, packets are highly likely to arrive out of order, causing this receiving device to re-order the packets. As a result, the receiving device must buffer the packets to place them in order before transmitting the packets. All of these conditions require extra hardware and/or software in the network devices implementing these methods In the second category, per-packet flow distribution methods aim to solve the noted problems of per-packet distribution by sending packets of a common packet flow across the same one of the parallel data paths. In general, these distribution methods apply a hash function to the packets to select one of the parallel data paths for a new packet flow. This can prevent packet reordering within a flow, but can lead to inefficient usage of links as flows can be assigned to a heavily loaded link even though other links are not used. Further, per-packet flow methods require tracking a vast array of characteristics of packet flows through the network in an attempt to ensure packets of the same flow traverse the same links while still allowing load balancing across multiple links. This requires maintenance of a massive data structure, such as a flow-to-link map table, to track the individual packet flows in real time. These methods require a large diversion of processing power and memory for maintaining the data structure. These methods also tend to result in inefficient bandwidth allocation among the links, and may result in a congested link receiving new packet flows although other links remain unused at the time of the new packet flow.

SUMMARY

In general, this disclosure describes techniques for distributing network traffic across a number of parallel data paths, e.g., physical links between two networking devices, two parallel label switched paths, or other parallel data paths within a network. The techniques combine the desirable qualities of both per-packet flow and per-packet load balancing. For example, the techniques described in this disclosure may distribute new packet flows across the parallel data paths dynamically to account for congested data paths while also preventing packets from existing packet flows from arriving out of order.

In accordance with these techniques, a network device selects one of the parallel data paths to use to forward packets of a packet flow by applying one of a set of hash functions to a packet header for a first one of the packets of the packet flow. The set of hash functions are designed such that there is a many-to-one correspondence between bins (i.e., outputs) of the set of hash functions and the data paths. In some examples, for a particular input, there exists a one-to-one correspondence between the bins of the set of hash functions and the data paths. That is, each of the data paths are mapped to by at least one bin of each of the hash functions. The network device typically applies a first one of the set of hash functions to select from among the data paths for a new packet flow. However, if the data path chosen by the first hash function is deemed congested, the network device applies a different one of the hash functions, which is designed to produce a different result than the first hash function for the same input. In this manner, the network device may avoid forwarding a new packet flow along a congested data path and instead forwards the packet flow along a different data path.

To ensure in-order delivery of packets for the same packet flow and for other existing packet flows, the network device applies the same hash function to each packet of a packet flow as was originally applied to the first packet of the data flow. For example, the network device may apply the hash function to the packet's 5-tuple {source IP address, destination IP address, source port number, destination port number, protocol}. Because the 5-tuple remains the same for each packet of a particular packet flow, the network device is able to identify to which packet flow a particular packet belongs. By using the same one of the hash function for each packet of a particular packet flow, the network device will select the same one of the data paths for each packet of the packet flow, thus ensuring in-order delivery of the packets of the packet flow.

To ensure that the same hash function is applied to each packet of a particular packet flow, the network device uses a Bloom filter to determine which of the hash functions to apply to the packets of the packet flow. For example, the network device may add a packet flow to the Bloom filter in the event the network device determines that the original data link selected for the packet flow is congested and, therefore, applies a second hash function to the packet flow. Upon receiving a subsequent packet, the network device selects a hash function from the set of hash functions using the Bloom filter. For example, the network device may determine whether or not the Bloom filter recognizes the 5-tuple of the packet's header and, based on this determination, selects from among the hash functions. That is, the network device may raise a membership query to the Bloom filter with the 5-tuple as the key. The Bloom filter may then determine whether the 5-tuple is represented by determining whether a signature for the 5-tuple is stored in the bit vector of the Bloom filter. For example, in the event the network device supports two hash functions, the network device applies the first hash function when the packet flow is not recognized by the Bloom filter and applies the second hash function when the packet flow is recognized by the Bloom filter. In this manner, the network device may consistently apply the same hash function to packets of a particular packet flow so as to preserve packet order, yet the network device is able to load balance on a per-packet flow basis without maintaining large data structure specifying the individual packet flows through the network.

In some embodiments, the network device may include more than two hash functions, e.g., to account for the possibility that a data path selected by the second hash function for the packet flow is also a congested data path. For example, when each of the links determined by each of a first hash function and a second hash function are congested, the network device may apply a third hash function to the 5-tuple or other portions of the packet to identify a third link over which to forward the packets of the packet flow. In this case, the network device may use a plurality of Bloom filters to determine which of a plurality of hash functions to apply to the packets. For example, the number of Bloom filters used to determine which of N hash functions to apply to a packet of a packet flow may equal $\log_2(N)$.

In one example, a method includes receiving, with a network device, a packet of a packet flow, wherein the network device is coupled to a plurality of parallel data paths, determining whether the packet is a request to establish a network connection, when the packet is a request to establish a network connection, querying a Bloom filter of the network device with the packet to determine whether the packet is a member of the Bloom filter, when the packet is not a member of the Bloom filter, selecting a first one of the plurality of parallel data paths with a first hash function and determining whether the first one of the parallel data paths is congested, and when the first one of the parallel data paths is congested, selecting a second one of the plurality of parallel data paths with a second hash function and forwarding the packet through the selected second one of the parallel data paths.

In another example, a network device includes an input network interface that receives a packet of a packet flow, a plurality of parallel output network interfaces, a link monitoring module that identifies each of the plurality of parallel output network interfaces that is congested, a Bloom filter that stores bit vector signatures of packet flows and determines whether a bit vector signature for a queried packet matches one of the stored bit vector signatures, a load balancing module that selects one of the plurality of parallel output network interfaces for the packet flow, wherein the load balancing module queries the Bloom filter to select one of a plurality of hash functions to apply to the packet, wherein the load balancing module applies the selected hash function to the packet to select the one of the plurality of parallel output network interfaces, and wherein the load balancing module queries the link monitoring module to determine whether the selected parallel output network interface is congested for packets that are requests to establish a network connection, and a control unit that determines whether the packet is a request to establish a network connection and that forwards the packet along the selected one of the plurality of parallel output network interfaces.

In another example, a computer-readable medium, such as a computer-readable storage medium, contains (e.g., is encoded with) instructions that cause a programmable processor to receive a packet of a packet flow, query a Bloom filter with the packet to determine whether a bit vector signature of the packet matches one of a plurality of bit vector signatures stored by the Bloom filter, when the bit vector signature matches one of the plurality of bit vector signatures stored by the Bloom filter, select a first one of the plurality of parallel data paths with a first hash function and forward the packet through the selected first one of the plurality of parallel data paths, when the bit vector signature does not match one of the plurality of bit vector signatures stored by the Bloom filter, determine whether the packet is request to establish a network connection, when the packet is a request to establish a network connection, select a second one of the plurality of parallel data paths with a second hash function and determine whether the selected second one of the parallel data paths is congested, when the selected second one of the parallel data paths is not congested, forward the packet through the selected second one of the parallel data paths, when the selected second one of the parallel data paths is congested, store the bit vector signature of the packet with the Bloom filter, select a third one of the parallel data paths with the first hash function, and forward the packet through the selected third one of the parallel data paths, and when the packet is not a request to establish a network connection, select a fourth one of the plurality of parallel data paths with the second hash function and forward the packet through the selected fourth one of the parallel data paths.

In another example, a computer-readable medium, such as a computer-readable storage medium, contains (e.g., is encoded with) instructions that cause a programmable processor to receive a packet of a packet flow, determine whether the packet is request to establish a network connection, when the packet is a request to establish a network connection, query a Bloom filter with the packet to determine whether a bit vector signature of the packet matches one of a plurality of bit vector signatures stored by the Bloom filter, when the bit vector signature matches one of the plurality of bit vector signatures stored by the Bloom filter, select a first one of the plurality of parallel data paths with a first hash function and forward the packet through the selected first one of the plurality of parallel data paths, when the bit vector signature does not match one of the plurality of bit vector signatures stored by the Bloom filter, select a second one of the plurality of parallel data paths with a second hash function and determine whether the selected second one of the parallel data paths is congested, when the selected second one of the parallel data paths is not congested, forward the packet through the selected second one of the parallel data paths, when the selected second one of the parallel data paths is congested, store the bit vector signature of the packet in the Bloom filter and forward the packet through the selected first one of the parallel data paths, when the packet is not a request to establish a network connection, determine whether the bit vector signature of the packet matches one of a plurality of bit vector signatures stored by the Bloom filter, when the bit vector signature matches one of the plurality of bit vector signatures stored by the Bloom filter, forward the packet using the first one of the plurality of parallel data paths, when the bit vector signature does not match one of the plurality of bit vector signatures stored by the Bloom filter, forward the packet through the selected second one of the parallel data paths.

In another example, a method includes applying a first set of hash functions to a packet to select one of a second set of hash functions to apply to the packet, wherein the second set of hash functions comprises a first hash function and a second hash function, applying the selected one of the second set of hash functions to the packet to select one of a set of parallel output interfaces of a network device through which to forward the packet, and forwarding the packet through the selected one of the parallel output interfaces.

The techniques described herein may provide several advantages. For example, the techniques described herein may enable assignment of new packet flows to non-congested links while preventing out-of-order delivery of packets of existing packet flows. Further, the network device is able to load balance on a per-packet flow basis without requiring large data structures and computing resources to track the individual packet flows through the network.

The details of one or more examples are set forth in the accompanying drawings and the description below. Other features, objects, and advantages will be apparent from the description and drawings, and from the claims.

DETAILED DESCRIPTION

Figure 1:
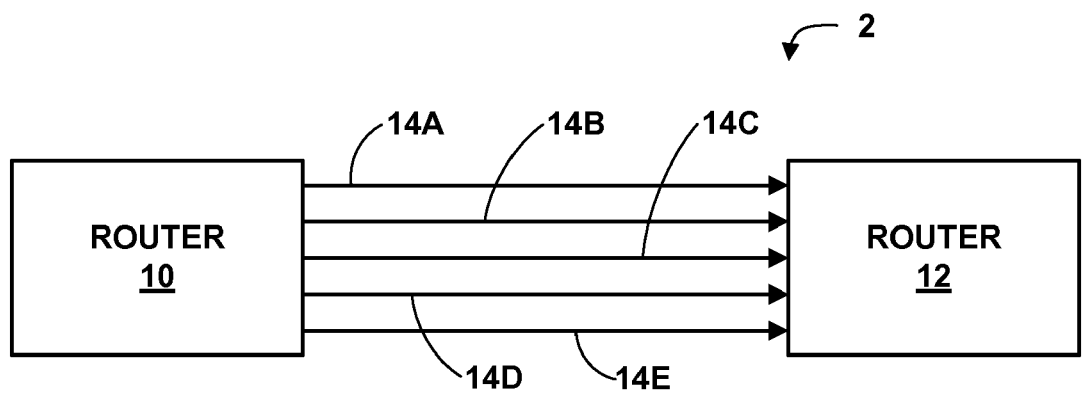
FIG. 1 is a block diagram illustrating an example system in which two routers communicate over multiple parallel links.

FIG. 1 is a block diagram illustrating an example system 2 in which router 10 and router 12 communicate over multiple parallel links 14A-14E (links 14). Links 14 may be, for example, Ethernet links, Frame Relay, Asynchronous Transfer Mode (ATM), Sonet-based optical connections, or other wired or wireless interconnects between router 10 and router 12. Routers 10, 12 may be connected to other network devices, such as switches, servers, computing devices, other routers, intrusion detection and prevention (IDP) devices, firewalls, management devices, or other network devices. Although described for purposes of example with respect to routers 10, 12, any network device that connects to another network device via multiple connections may employ the techniques described in this disclosure.

In accordance with the techniques described in this disclosure, router 10, for example, dynamically balances the load of links 14. Router 10 initially receives a packet from another network device (not shown), which router 10 determines is to be forwarded to router 12. Router 10 therefore selects one of links 14 through which to send the packet. To do so, router 10 applies one of a set of hash functions to the packet. For IP packets, router 10 may apply the one of the hash function to the packet header, e.g., the 5-tuple {source IP address, destination IP address, source port number, destination port number, protocol}. In one example, the set of hash functions includes two hash functions, $\{H_A, H_B\}$, such that for any packet header PH, $H_A(PH) \#H_B(PH)$. In another example, the set of hash functions includes N hash functions, $\{H_A, H_B, \ldots H_N\}$, such that for any packet header PH, $H_A(PH) \#H_B(PH) \# \ldots \#H_N(PH)$. In this way, the set of hash functions may be viewed as mutually exclusive in that no two of the hash functions produce the same result when applied to a packet header. Further, the bins of each of the set of hash functions are mapped to links 14. That is, each bin of each of the hash functions is mapped to one of links 14 such that each of links 14 is mapped to one or more of the bins of a hash function. In some examples, there exists a one-to-many relationship between links 14 and the bins of a hash function. In other examples, the relationship between the bins of a hash function and links 14 may be one-to-one and onto. In general, bins of the hash functions are mapped to links 14 such that there are approximately the same number of bins mapped to each of links 14. By applying one of the set of hash functions to the packet headers, e.g., the 5-tuple, for packets of different packet flows, router 10 may achieve load balancing of the packet flows across links 14. Moreover, by selecting different hash functions for different packet flows, as described herein, router 10 may achieve load balancing on a per-packet flow basis while yet avoiding congested links.

For example, in certain circumstances, the hash function that router 10 initially selects and applies to the 5-tuple for a packet of a new packet flow may result in selection of one of links 14 that is currently congested, e.g., link 14C. As described herein, router 10 proceeds to select a different one of the set of hash functions to apply to the 5-tuple of the packet header. As noted above, each of the set of hash functions provide a different output for the same input. In this manner, a different one of the set of hash functions, when applied to the same packet header, identifies a different one of links 14, e.g., link 14B.

To ensure in-order delivery of packets of a particular packet flow, router 10 applies the same one of the set of hash functions to each packet of a particular packet flow once the hash function is selected for the packet flow. Further, router 10 uses a series of one or more Bloom filters to efficiently select one of the set of hash functions to apply to the packets of a particular packet flow in real time, as described in greater detail below, without requiring large data structures for tracking individual packet flows within the network. For each packet router 10 receives, router 10 determines whether the packet is part of a new packet flow or an existing packet flow. In one example, router 10 inspects the packet to determine whether the packet is a synchronization (SYN) packet, i.e., a packet typically sent by a client network device that is used to initiate a new TCP/IP connection. This allows router 10 to easily determine which packets belong to new connections while other packets belong to existing connections. Similarly, router 10 may apply other forms of packet inspection or fingerprinting to identify packets typically associated with new connections.

When the packet belongs to a new connection, router 10 applies a first one of the set of hash functions, e.g., $H_A$, to the 5-tuple, to identify one of links 14 for which to output the packet. Next, router 10 accesses current usage data for the selected link to determine whether the selected link is currently at or near congestion levels. When the identified one of links 14 is not congested, router 10 forwards the packet along the one of links 14. When the one of links 14 is congested, however, router 10 adds the 5-tuple of the packet header to the Bloom filter and selects a second one of the set of hash functions, e.g., $H_B$. Router 10 then selects a different one of links 14 by applying the second one of the set of hash functions, e.g., $H_B$, to the 5-tuple and forwards the packet along the different one of links 14. In other examples, router 10 may add a different identifier of a packet flow to the Bloom filter, not necessarily the 5-tuple.

When the packet belongs to an existing connection, router 10 forwards the packet along the one of links 14 that has previously been used for forwarding earlier packets of the packet flow. In this manner, router 10 may ensure in-order delivery of the packets of the packet flow. Router 10 queries the Bloom filter to determine which of the hash functions to apply to the packet. When the Bloom filter identifies the packet as belonging to a packet flow that has been seen before by router 10, router 10 applies $H_B$ to the packet, but when the Bloom filter does not identify the packet as associated with a previously received packet flow, router 10 applies $H_A$ to the packet. Moreover, as explained below, router 10 implements Bloom filter so as to make such a determination without requiring a voluminous data structure recording each indicating packet flow. Rather, router 10 can efficiently apply Bloom filter so as to readily determine whether the packet belongs to a packet flow that has already been seen without specifically identify the packet flow. In this manner, router 10 may select between the first set of hash functions in real-time for each individual packet forwarded along links 14.

In general, router 10 implements the Bloom filter as a data structure that includes a bit vector and a set of hash functions with bins of the hash functions mapped to each bit of the bit vector, where each of the hash functions selects a different bit of the bit vector for the same input. Initially, router 10 initializes Bloom filter to an empty state with each of the bits of the bit vector set to "0." To add an element (i.e., an indicator that a packet flow has been recently received), router 10 invokes the Bloom filter to apply each of the hash functions to the element to identify bits of the bit vector and set each of the identified bits to "1." That is, for a given input, such a packet header's 5-tuple, the corresponding bits of the bit vector corresponding to all of the bins selected by the plurality of has functions are set. This bit vector then defines a signature for the particular 5-tuple. The Bloom filter may also be queried to determine whether the Bloom filter recognizes a particular element, i.e., whether the element is already a member of the Bloom filter. To do so, the Bloom filter applies each of the hash functions to the element in question and returns "true" when the bits identified by each of the hash functions are equal to "1" and returns "false" otherwise. Although the possibility of false positives exists, there is no possibility of a false negative. That is, the Bloom filter may return "true" for an element even when that specific element has not previously been added to the Bloom filter. This may, for example, be the case when packet flows resulting in the same bit vector signature are processed by the Bloom filter. However, the Bloom filter will not return "false" for an element when the element has previously been added to the Bloom filter (assuming that the bits of the bit vector have not been cleared). In one example, router 10 may query the Bloom filter for packets of a new connection, to account for the possibility of false positives.

With respect to the example of FIG. 1, when forwarding each packet router 10 queries the Bloom filter by sending portions of the packet's header to the Bloom filter and receiving either a "true" or a "false" response. When the response from the Bloom filter is "true," router 10 applies $H_B$ to the packet header, as this indicates that a packet flow of this resulting bit-vector signature has been seen before by router 10 and is currently using the second of the set of hash functions. When the response is "false," router 10 initially applies $H_A$ to the packet header as the response indicates that no packet flows of this bit-vector signature has been seen recently, i.e., within a defined time period. Router 10 may then proceed to use $H_B$ record this fact in the Bloom filter in the event the link selected as a result of the application of $H_A$ is currently at or near congestion.

To return the result of "true" or "false," the Bloom filter applies each of the multiple hash functions of the Bloom filter to the packet header to identify bits of a bit vector, thereby producing the bit-vector signature. When each of the bits of the bit vector identified by the hash functions is a "1," the Bloom filter returns "true," otherwise, the Bloom filter returns "false." Table 1 summarizes the determinations made by router 10. In Table 1, hash functions identified $H_X$, where X is an integer between 1 and N, correspond to hash functions internal to the Bloom filter, where N is an integer corresponding to the number of hash functions internal to the Bloom filter. Hash functions in Table 1 identified by $H_P$, where P is a letter (e.g., A or B), correspond to hash functions for identifying one of links 14. PH in Table 1 is an abbreviation of "packet header."

TABLE 1

| $H_1(PH) \wedge H_2(PH) \wedge \ldots \wedge H_N(PH)$ | Hash to apply |
| --- | --- |
| False | $H_A$ |
| True | $H_B$ |

Router 10 may also maintain one or more timers to clear respective bits of the bit vector of the Bloom filter. For example, router 10 may maintain a timer for each of the bits of the bit vector, where the time that counts down from a particular defined time to zero. Each time the bit receives a "hit," e.g., is set to 1 or is used by a query for determining whether the bit is set, router 10 resets the timer for the bit to the defined time. When the timer for a particular bit reaches zero, that specific bit of the Bloom filter is reset to "0." As another example, router 10 may maintain a stack-like data structure that maintains a record of the least recently used bits. When a bit receives a hit, an identifier of the bit is moved to the bottom of the stack. Router 10 periodically pops the top of the stack and clears the bit identified by the popped element. Router 10 may perform a pop on the stack at defined time intervals, e.g., every N seconds after a last hit. Alternatively, each of the elements of the stack may identify a time at which the corresponding bit was last hit. When a certain time interval has been exceeded for the top element of the stack from the time the top element was last hit, router 10 may pop the stack and set the bit identified by the popped element to "0." The time interval may correspond to any value greater than the trip delay between current router and destination or other network timing metric which can avoid reordering.

The example of FIG. 1 may provide several advantages. For example, router 10 may assign new packet flows to non-congested links while avoiding out-of-order delivery of packets of existing packet flows. Using the techniques described herein, there is a very low probability of assigning a new packet flow to a congested link when a non-congested link is available. That is, let L be the number of links 14, N be the number of packet flows, K be the number of hash functions internal to the Bloom filter, and M be length of the bit vector within the Bloom filter. The probability that a particular bit in the bit vector of the Bloom filter is 0 after all N packet flows have been added to the Bloom filter is $$\left(1 - \frac{1}{M}\right)^{K*N},$$

which is approximately $e^{-K*N/M}$. Let p be this probability, i.e., let $p = e^{-K*N/M}$. The probability of a false positive, i.e., two or more packet flows being mapped to the same bin, result for the Bloom filter is then $(1-p)^K$. When the second hash function $H_B$ is applied after determining that a link selected by applying the first hash function $H_A$ is congested, the probability that the link selected by the second hash function $H_B$ is congested is $$\frac{(1-p)^K}{L}.$$

Thus the probability of assigning a new packet flow to a congested link when a less congested link exists is low, and the probability decreases as the number of available parallel links L increases. Further discussion of this probability and the methods thereof are presented in Arun Kumar S P & Mukul Golash, *Efficient Flow-aware Dynamic Link Load Balancing*, in the Proceedings of The First International Conference on Communication Systems and Networks (COMSNETS) 2009, Mar. 31, 2009, available at http://ieeexplore.ieee.org/stamp/stamp.jsp?arnumber=4808841&isnumber=4808829 (DOI 10.1109/COMSNETS.2009.4808841) (ISBN 978-1-4244-2912-7), which is hereby incorporated by reference in its entirety.

Although the example above is described as having a set of two hash functions for selecting between links 14, router 10 may use any number of hash functions for selecting between links 14. For example, let the function $BF_X(PH)$ be defined as $(H_{X1}(PH)\char`^H_{X2}(PH)\char`^ \ldots \char`^H_{XN}(PH))$, where X varies between 1 and M, the number of Bloom filters. The number of hash functions K that can be identified by M Bloom filters is $2^M$, i.e., $K = 2^M$. Similarly, for K hash functions, where K is an integer, at least $\log_2(K)$ Bloom filters are needed to select from among the K hash functions. For example, three Bloom filters (i.e., M=3) can determine which of eight ($2^3=8$) hash functions to apply. In general, each possible pattern of returned values of "true" and "false" for each of the M Bloom filters is mapped to a particular one of the K hash functions. Table 2 depicts one example for determining which of the eight hash functions to apply based on which of three Bloom filters recognizes a particular packet of the packet flows.

TABLE 2

| $BF_1(PH)$ | $BF_2(PH)$ | $BF_3(PH)$ | Hash to apply |
|---|---|---|---|
| False | False | False | $H_A$ |
| False | False | True | $H_B$ |
| False | True | False | $H_C$ |
| False | True | True | $H_D$ |
| True | False | False | $H_E$ |
| True | False | True | $H_F$ |
| True | True | False | $H_G$ |
| True | True | True | $H_H$ |

Figure 2:
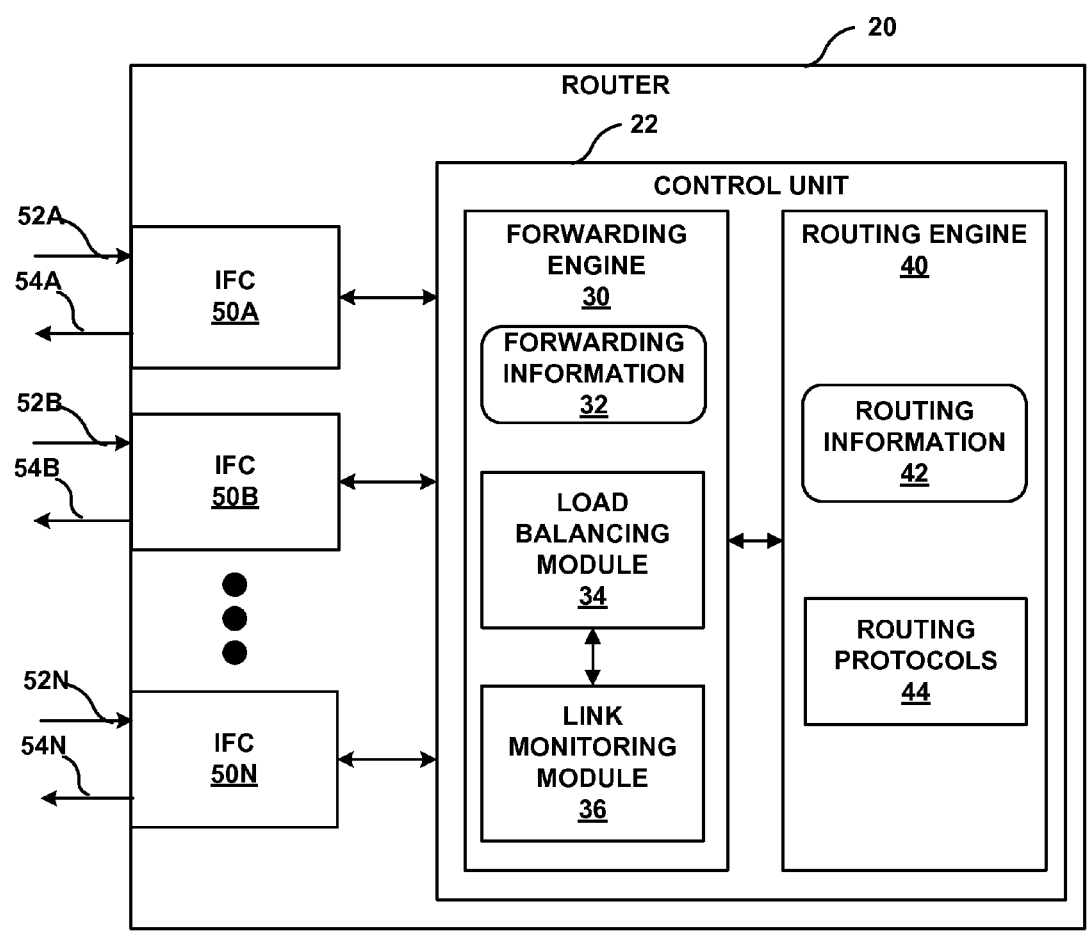
FIG. 2 is a block diagram illustrating an example router that may implement the techniques described in this disclosure.

FIG. 2 is a block diagram illustrating an example router 20 that may implement the techniques described in this disclosure. Router 20 may correspond to either or both of router 10 and router 12 of FIG. 1. Router 20 includes interface cards 50A-50N (IFCs 50) for receiving packets via input links 52A-52N (input links 52) and sending packets via output links 54A-54N (output links 54).

When router 20 receives a packet via one of input links 52, control unit 22 determines via which of output links 54 to send the packet. Control unit 22 includes routing engine 40 and forwarding engine 30. Routing engine 40 determines one or more routes through a network, e.g., through interconnected devices such as other routers. Routing engine 40 implements one or more routing protocols 44. Routing protocols 44 may include, for example, intermediate system to intermediate system (IS-IS), open shortest path first (OSPF), routing information protocol (RIP), border gateway protocol (BGP), or other routing protocols. By executing routing protocols 44, routing engine 40 identifies existing routes through the network and determines new routes through the network. Routing engine 40 stores routing information 42 that includes, for example, known routes through the network.

Routing engine 40 applies one of routing protocols 44 to a packet to determine a route from routing information 42 along which to forward the packet. Routing engine 40 sends the packet to forwarding engine 30 to identify one of IFCs 50 through which to forward the packet. All or a subset of IFCs 50 may include parallel input links 52 and output links 54. That is, all or a portion of output links 54 may connect router 20 to a common network device. For purposes of explanation, it is assumed that all of output links 54 are in parallel for this example, although it should be understood that only a portion of output links 54 may be in parallel while other ones of output links 54 may connect to a different network device.

Forwarding engine 30 stores forwarding information 32 that associates network addresses, e.g., IP addresses or IP prefixes of next hops (e.g., neighboring routers) with output interfaces coupled to links 54. When forwarding a packet, forwarding engine 30 processes a key from the packet's header to traverse forwarding information 30 and ultimately select a next hop to which to forward the packet. Based on the selected next hop, forwarding engine 30 identifies the set of one or more links (e.g., links 14 of FIG. 1) that are coupled to the next hop. In the event multiple links exist, forwarding engine 30 invokes load balancing module 34 as described herein so as to load balance the packets across the multiple links. In other embodiment, forwarding engine 30 may invoke load balancing module 34 to load balance across logical links or multiple paths through the network to a common destination even though those paths do not utilize the same next hop.

In either case, load balancing module 34 of forwarding engine 30 identifies one of output links 54 through which to forward packets of a new packet flow. After load balancing module 34 has selected one of output links 54 for a packet flow, forwarding engine 30 forwards all packets of the packet flow along the selected one of output links 54. Load balancing module 34 communicates with link monitoring module 36 to determine whether a particular one of output links 54 is congested before assigning a new packet flow to the one of output links 54.

Link monitoring module 36 determines whether output links 54 are congested. For example, link monitoring module 36 may determine a relative congestion level of each output links 54. In one example, link monitoring module 36 determines a bandwidth utilization for each of output links 54. In another example, link monitoring module 36 determines whether a number of packet flows assigned to a particular one of output links 54 has exceeded a threshold. In another example, link monitoring module 36 determines a number of packets per second being sent over each of output links 54. In another example, link monitoring module 36 determines a number of bits per second (bps) being sent over each of output links 54. In other examples, link monitoring module 36 may utilize a combination of the above-described techniques, or other techniques for determining link congestion. In any case, link monitoring module 36 determines whether one or more of output links 54 are congested.

In one example, link monitoring module 36 may determine an ordering of output links 54 in order of relative congestion, rather than providing a binary response with respect to congestion (i.e., link X is congested or link X is not congested). In this manner, load balancing module 34 may determine whether a particular link is the most heavily congested link, rather than determining whether or not the link is congested. When the link selected for a new packet flow is the most heavily congested, load balancing module 34 may select a different link to assign to the new packet flow.

Figure 3:
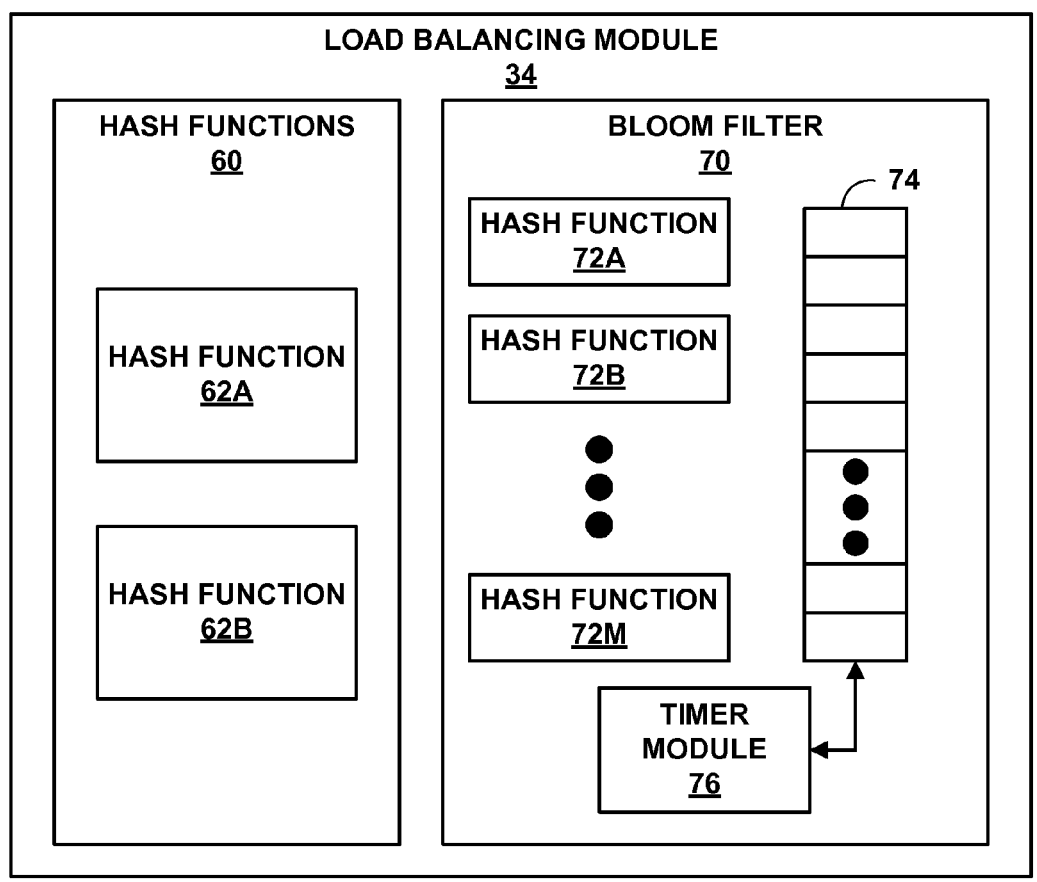
FIG. 3 is a block diagram illustrating an example of a load balancing module.

As described in greater detail with respect to FIG. 3, load balancing module 34 balances packet flows across output links 54 by selecting a non-congested or less-congested one of output links 54 to which to assign a new packet flow. Upon receiving a new packet flow, load balancing module 34 selects one of output links 54. Load balancing module 34 queries link monitoring module 36 to determine whether the one of output links 54 is congested. If not, load balancing module 34 assigns the new packet flow to the selected one of output links 54. When the one of output links 54 is congested, however, load balancing module 34 selects a different one of output links 54 and assigns the new packet flow to the different one of output links 54.

FIG. 3 is a block diagram illustrating an example of load balancing module 34 of FIG. 2 in greater detail. Load balancing module 34 balances packet flows across output links 54. To perform load balancing, load balancing module 34 selects an output interface of IFCs 50 by applying one of hash functions 60 to a packet of a new packet flow. In the example of FIG. 3, hash functions 60 comprise a set of two hash functions, hash function 62A and hash function 62B. In other examples, hash functions 60 may include any number of hash functions 62. In general, hash functions 60 are mutually exclusive in that each of the hash functions generates a different output for the same input.

Load balancing module 34 may, by default, apply hash function 62A to a packet of a new packet flow to select one of IFCs 50 though which to forward the packets of the new packet flow. For example, load balancing module 34 applies hash function 62A to a packet header PH of the packet, such as the 5-tuple {source IP address, destination IP address, source port number, destination port number, protocol}. As one example, hash function 62A may identify an output interface of IFC 50A for a particular packet header of a packet of a new packet flow when hash function 62A is applied to the packet header.

Next, load balancing module 34 determines whether the link identified by hash function 62A is congested by querying link monitoring module 36 with an identification of the link. In the example above, load balancing module 34 queries link monitoring module 36 with an interface identifier or index associated with output link 54A to determine whether output link 54A is congested. When link monitoring module 36 determines that the one of output links 54 is congested, load balancing module 34 selects a different one of IFCs 50 by applying a different one of hash functions 60 to the packet of the new packet flow. For example, when link monitoring module 36 determines that the link identified by hash function 62A is congested, load balancing module 34 selects a link for the packet flow by applying hash function 62B to the packet header of the packet of the new packet flow. Load balancing module 34 also adds the new packet flow to Bloom filter 70 so that, when another packet of the packet flow is received, load balancing module 34 will apply hash function 62B to the packet, rather than hash function 62A.

For existing packet flows, load balancing module 34 applies the same one of hash functions 60 to all packets of the packet flow. Load balancing module 34 uses Bloom filter 70 to determine which of hash functions 60 to apply to a packet of an existing packet flow. In the example of FIG. 3, in which load balancing module 34 includes two hash functions 60, load balancing module 34 includes only one Bloom filter. In other examples, load balancing module 34 may include $\log_2(N)$ Bloom filters, where N is an integer corresponding to the number of hash functions 60.

Bloom filter 70 can be logically represented as including hash functions 72A-72M (hash functions 72) that represent a plurality of different hashing algorithms, bit vector 74, and timer module 76. Each of the hash functions is associated with a set of hash bins, where the hash values computed from the hash function are grouped into (i.e., spread over) the bins. Bloom filter 70 further maps the bins of hash functions 72 to corresponding bits of bit vector 74. In one example, there is also a one-to-one correspondence between the bins of each of hash functions 72 and bits of bit vector 74. That is, assuming bit vector 74 has a length L, i.e., L individual bits, hash function 72A will have L hash bins, each of which is uniquely mapped to one of the L bits of bit vector 74. Similarly, hash function 72B is constructed so as to have L bins, each of which is mapped, in some cases uniquely mapped, to one of the L bits of bit vector 74 and according to a different mapping than that of hash function 72A. Therefore, each of hash functions 72 may be applied to a particular input, e.g., a 5-tuple of a packet header, and will produce an output of M unique locations within bit vector 74. In one example, bit vector 74 may include, for example, 1024 bits. In one example, Bloom filter 70 may include eight hash functions 72. In general, Bloom filter 70 is able to recognize (L Choose M, elements, i.e., $$\binom{L}{M}$$

elements, i.e., $$\left(\frac{L!}{M!(L-M)!}\right)$$

elements. Thus, in an example where bit vector 74 includes 1024 bits and Bloom filter 70 includes eight hash functions, Bloom filter 70 may recognize $2.9*10^{19}$ elements (including false positive elements). In other embodiments, the hash functions 72 may have a different number of hash bins, and bit vector 74 has a bit depth equal to the largest number of bins for the hash functions.

Load balancing module 34 invokes Bloom filter 70 to add elements to Bloom filter 70 and query Bloom filter 70 to determine whether a particular element is a member of Bloom filter 70. To add an element, Bloom filter 70 applies each of hash functions 72 to the element and sets each of the bits corresponding to the resulting bins of hash functions 72 in bit vector 74 to "1." To determine whether an element is a member of Bloom filter 70, Bloom filter 70 applies each of hash functions 72 to the element and returns "true," i.e., that the element is a member, only when each of the bits corresponding to the resulting bins of hash functions 72 in bit vector 74 is set to "1." When at least one of the bits corresponding to the resulting bins of hash functions 72 is set to "0," Bloom filter 70 returns "false," i.e., that the element is not a member.

In one example, to account for the possibility of false positives from Bloom filter 70, load balancing module 34 may, upon receiving a packet of a new packet flow, query Bloom filter 70 to determine whether Bloom filter 70 indicates that the packet flow is an element before checking whether a link identified by hash function 62A is congested. Although the packet flow should not have been added to Bloom filter 70, because the packet flow is a new packet flow, the possibility may exist that Bloom filter 70 will nevertheless determine that the packet flow is a member of Bloom filter 70, i.e., Bloom filter 70 may return a false positive response. In such a case, load balancing module 34 may select the link indicated by hash function 62B without determining whether the link identified by hash function 62A is congested because, when another packet of the packet flow is received, Bloom filter 70 will indicate that the packet flow is an element. In this manner, load balancing module 34 may ensure that the packets of the new packet flow arrive in order.

In the example of FIG. 3, Bloom filter 70 also includes timer module 76. To remove elements from Bloom filter 70, Bloom filter 70 periodically clears bits of bit vector 74 that have not been recently used, i.e., added or queried. Timer module 76 determines when Bloom filter 70 should clear one or more bits of bit vector 74. In one example, Bloom filter 70 stores a time for each of the bits of bit vector 74 at which the bit was last used, e.g., when the bit was last set to 1 as a result of adding an element or when the bit was last checked to determine whether the bit was set as part of a query to determine whether an element was a member. When timer module 76 indicates that a time to clear a bit has arrived, Bloom filter 70 determines which of the bits of bit vector 74 was least recently used and clears the determined bit, i.e., sets the bit to a value of "0." Timer 76 may cause Bloom filter 70 to clear a bit based on an estimation of the trip time between router 20 and another network device connected via output links 54. In this manner, if a bit is cleared before all packets of the corresponding packet flow have been sent, the remaining packets will not arrive at the other network device out of order, because the earlier packets of the packet flow will have arrived before the bit is cleared.

In one example, load balancing module 34 applies a method similar to the following pseudocode to select a link for a received packet:

```
int Link_Selector(int Packet_Header) {
/*   Link_Selector returns an integer value
     corresponding to an enumerated set of
*         parallel output links
*    Packet_Header is an integer value corresponding
     to the header of a packet */
   if (isSynPacket(Packet_Header)) {
     /*    If the packet is a syn packet, the packet belongs to a new
*    connection */
     if (Bloom_Filter.Is_Member(Packet_Header)):
            return Second_Hash(Packet_Header);
     else:
            // determine whether link selected by the first hash function
            // is congested
            int link = First_Hash(Packet_Header);
            if (isCongested(link)):
                   /* when the link determined by the first hash is
                    * congested, add the packet flow to the bloom
                    * filter and use the link determined by the
                    * second hash */
                   Bloom_Filter.add(Packet_Header);
                   return Second_Hash(Packet_Header);
            else:
                   return link;
   else:  // packet belongs to an existing connection
         if (Bloom_Filter.Is_Member(Packet_Header)):
             return Second_Hash(Packet_Header);
         else:
             return First_Hash(Packet_Header);
class Bloom_Filter:
     private bit vector[len]; // vector[ ] is an array
         of bits with length "len"
     private int numHashes; // numHashes
         corresponds to a number of hash
                 // functions implemented by Bloom_Filter
     private Hash[numHashes]; // Hash[ ]
         corresponds to a set of hash functions
                 // with bins corresponding to len, i.e., the length of
                 // bit vector vector[ ]
     public void add(int link):
     // adds a link to be recognized by Bloom_Filter
         int pos;
         for (int i=0; i < numHashes; i++):
             pos = Hash[i].calculate(link); //
             determine the position in the
                                          // bit vector
             vector[pos] = 1;
     public Boolean isMember(int link):
     // returns True only if "link" is recognized by Bloom_Filter
         Boolean member = True;
         for (int i = 0; i < numHashes AND member; i++)
             pos = Hash[i];
             if (vector[pos]== 0):
                 member = False;
         return member;
```

Although in the example pseudocode the hash functions of the Bloom filter are shown to execute sequentially, in some examples, each of the hash functions of the Bloom filter may execute in parallel, e.g., in hardware internal to router 20, rather than being executed sequentially. In this manner, the example of control unit 22 as described with respect to FIG. 3 applies each of a first set of hash functions, i.e., hash functions 72, to a packet and applies one of a second set of hash functions, i.e., hash functions 60, to the packet. Each bin of each of hash functions 72 is mapped to a bit of bit vector 74. Each bin of each hash functions 60 is mapped to one of output links 54. Control unit 22 selects one hash functions 60 to apply to the packet based on values of the bits of bit vector 74. Control unit 22 also forwards the packet through the one of output links 54 that is mapped to the bin of the selected one of hash functions 60 when the control unit applies the selected one of hash functions 60 to the packet.

Figure 4:
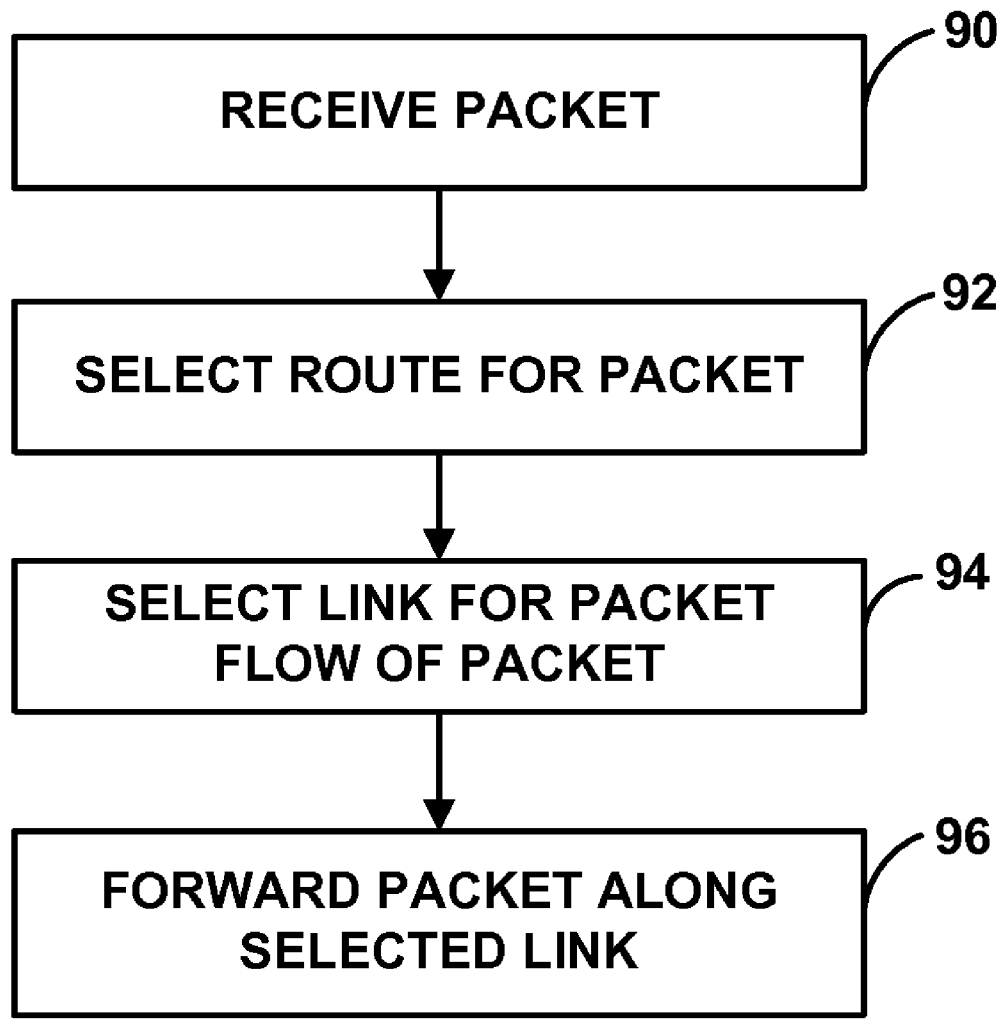
FIG. 4 is a flowchart illustrating an example method for dynamically balancing packet flows across parallel data paths.

FIG. 4 is a flowchart illustrating an example method for dynamically balancing packet flows across parallel data paths. Although discussed with respect to example router 20 of FIG. 2, it should be understood that any network device that forwards packets across parallel data paths may apply the method described with respect to FIG. 4.

Initially, router 20 receives a packet via one of input links 52 (90). The packet may be a packet of a new packet flow or of a packet flow currently being forwarded by router 20. A header of the packet indicates a destination for the packet. Routing engine 40 selects a route to reach the destination of the packet (92) by executing routing protocols 44 and referring to routing information 42.

After routing engine 40 selects the route for the packet, forwarding engine 30 selects a link through which to forward the packet to reach a next hop along the route from router 20 (94). To ensure in-order delivery of packets of the packet flow corresponding to the received packet, forwarding engine 30 uses a Bloom filter to select the same hash function to apply to subsequent packets of the packet flow. By applying the same hash function to the subsequent packets, forwarding engine 30 will select the same outgoing link for each packet of the packet flow. When the packet represents a new packet flow, forwarding engine 30 selects a link that is not congested for the new packet flow using load balancing module 34 to select the link and link monitoring module 36 to determine whether a particular link is congested. After forwarding engine 30 has selected a link for the packet flow, router 20 forwards the packet along the selected link (96).

Figure 5:
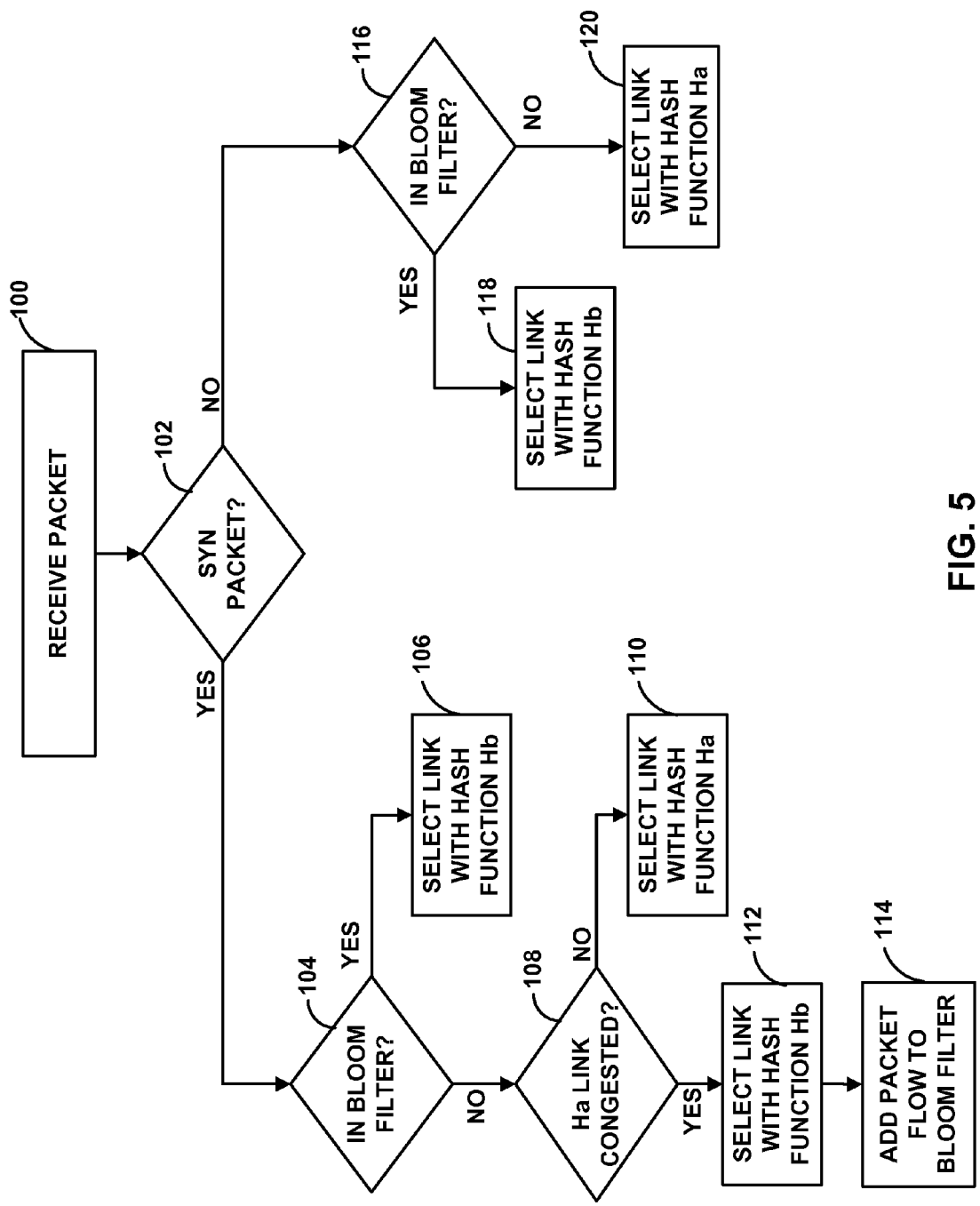
FIG. 5 is a flowchart illustrating an example method for selecting a link for a packet flow.

FIG. 5 is a flowchart illustrating an example method for selecting a link for a packet flow. In one example, the method of FIG. 5 may correspond to step (94) of FIG. 3. Although discussed with respect to example router 20 of FIG. 2, it should be understood that any network device that forwards packets across parallel data paths may apply the method described with respect to FIG. 5. In FIG. 5, "Ha" corresponds to hash function 62A and "Hb" corresponds to hash function 62B of FIG. 3. However, in other examples, "Ha" and "Hb" may generally correspond to any two hash functions that produce different outputs for the same input with bins mapped to output interfaces of a network device. In accordance with the example method of FIG. 5, router 20 may apply a first set of hash functions to a packet to select one of a second set of hash functions to apply to the packet, wherein the second set of hash functions comprises a first hash function and a second hash function, apply the selected one of the second set of hash functions to the packet to select one of a set of parallel output interfaces of a network device through which to forward the packet, and forward the packet through the selected one of the parallel output interfaces.

Initially, forwarding engine 30 receives the packet (100). Forwarding engine 30 sends the packet, or a header of the packet or a pointer to the packet, to load balancing module 34 to select a link via which to forward the packet to the next hop as selected by forwarding hardware within forwarding engine 30 in accordance with routing information 42 maintained by routing engine 40. Load balancing mo dule 34 inspects the packet header to determine whether the packet is a SYN packet (102). When the packet is a SYN packet ("YES" branch of 102), link balancing module 34 determines that the packet corresponds to a new packet flow. In some cases, although the packet corresponds to a new packet flow, Bloom filter 70 may nevertheless determine that a bit vector signature for the new packet flow is recognized. That is, bits of the bit vector of Bloom filter 70 corresponding to the signature for the new packet flow may already be set to a value of "1." This may occur as a result of Bloom filter 70 having set the bits corresponding to the bit vector signature for the new packet flow to the value of 1 after having added one or more other packet flows. Such a case is referred to as a "false positive" because Bloom filter 70, when queried with the packet of the new packet flow, determines that the bit vector signature indicates that the packet is a member of Bloom filter 70, despite the fact that the packet has not been added to Bloom filter 70. In recognition of this possibility, load balancing module 34 queries Bloom filter 70 to determine whether the packet flow is an element of Bloom filter 70 (104). When Bloom filter 70 recognizes the new packet flow, i.e., when the set of hash functions produce a bit vector signature of all ones indicating that such a packet flow has been seen before, ("YES" branch of 104), load balancing module 34 selects one of output links 54 corresponding to the bin of hash function 62B when applied to the packet header (106).

When Bloom filter 70 does not recognize the new packet flow ("NO" branch of 104), load balancing module 34 determines, for one of output links 54 corresponding to the bin of hash function 62A when applied to the packet header, whether the one of output links 54 is congested (108). That is, load balancing module 34 queries link monitoring module 36 with an identifier of the one of output links 54 and receives a response indicating either that the one of output links 54 is or is not congested. When the one of output links 54 is not congested ("NO" branch of 108), load balancing module 34 selects the one of output links 54 corresponding to the output of hash function 62A when applied to the packet header. However, when the one of output links 54 is congested, load balancing module 34 instead selects a different one of output links 54 that corresponds to output of hash function 62B (112) and adds the packet flow to Bloom filter 70 (114).

When the packet is not a SYN packet ("NO" branch of 102), load balancing module 34 queries Bloom filter 70 to determine whether the packet flow is an element of Bloom filter 70 (116). When Bloom filter 70 determines that the packet flow is an element of Bloom filter 70 ("YES" branch of 116), load balancing module 34 selects one of output links 54 corresponding to output of hash function 62B when applied to the packet header (118). However, when Bloom filter 70 determines that the packet flow is not an element ("NO" branch of 116), load balancing module 34 selects a different one of output links 54 corresponding to output of hash function 62A when applied to the packet header (120).

Another example method that is similar to the method of FIG. 5 includes querying the Bloom filter to determine whether the Bloom filter has stored a signature representative of the packet before determining whether the packet is a SYN packet. When the Bloom filter stores a signature representative of the packet, the method includes using the hash function corresponding to the Bloom filter to select the link through which to forward the packet. When the Bloom filter does not store the signature, the method includes determining whether a link selected by a different hash function (that does not correspond to the Bloom filter) is congested. When the link is congested, the method selects a different link using the hash function corresponding to the Bloom filter and adding the signature for the packet to the Bloom filter. Otherwise, the method includes selecting the non-congested link.

Figure 6:
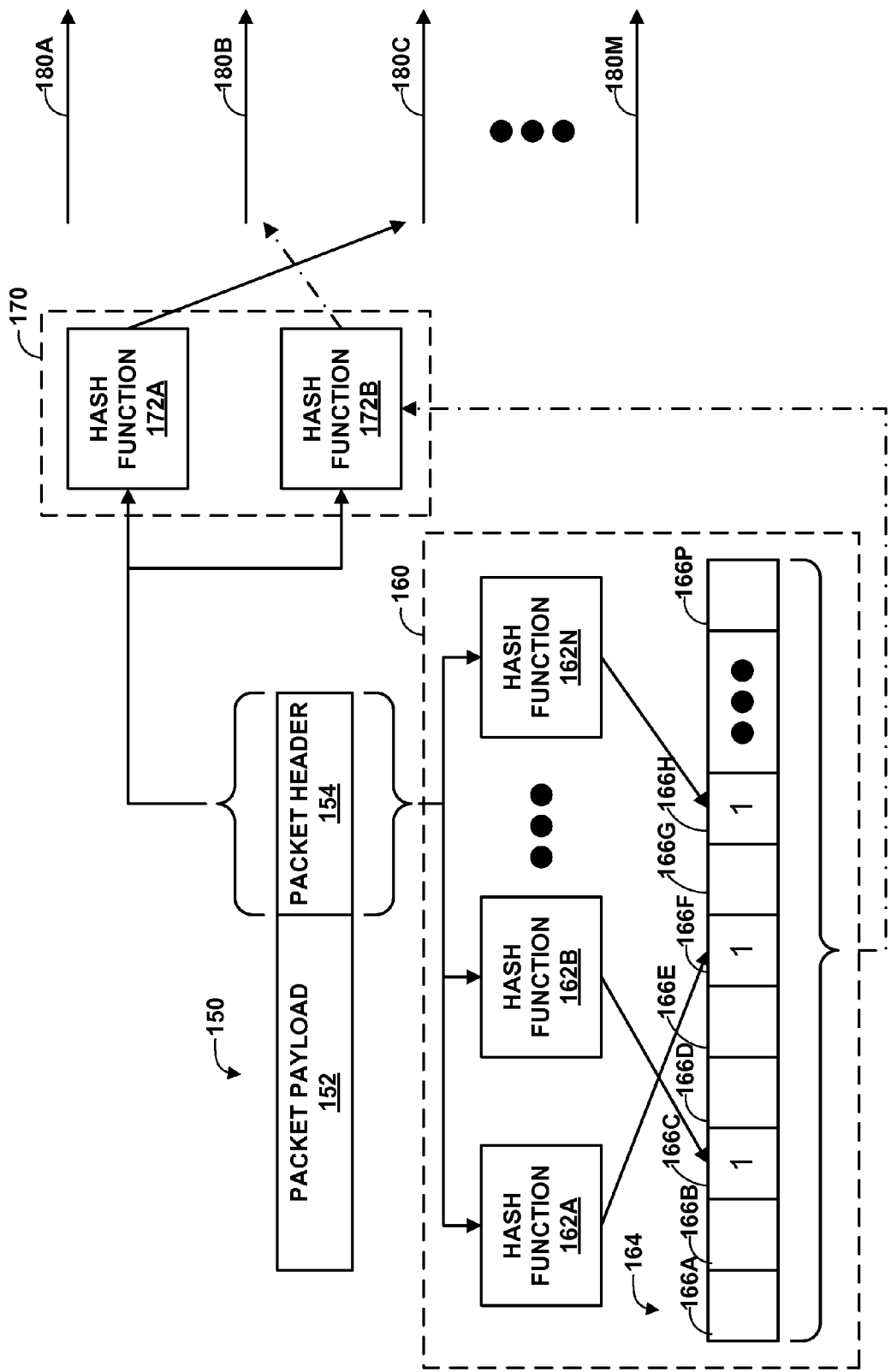
FIG. 6 is a conceptual diagram illustrating an example Bloom filter that is used to select between a set of hash functions that are applied to select one of a plurality of parallel links via which to forward a packet.

FIG. 6 is a conceptual diagram illustrating an example Bloom filter 160 that is used to select between a set of hash functions 170 that are applied to select one of links 180A-180C (links 180) via which to forward packet 150. Bins of each of the set of hash functions 170, i.e., hash functions 172A and 172B in the example of FIG. 6, are mapped to links 180 such that each of hash functions 170 will select a different one of links 180 for the same input. Similarly, there is a one-to-one correspondence between bins of each of hash functions 170 and links 180. In the example of FIG. 6, packet 150 includes packet payload 152 and packet header 154. Hash functions 172A and 172B are each applied to packet header 154. However, when hash function 172A is applied to packet header 154, hash function 172A selects link 180C, and when hash function 172B is applied to packet header 154, hash function 172B selects link 180C.

Bloom filter 160 includes a distinct set of hash functions 162A-162N (hash functions 162). Bins of hash functions 162 are mapped to bits 166A-166P (bits 166) of bit vector 164. There exists a one-to-one correspondence between bins of each of hash functions 162 and bits 166. Moreover, each of hash functions 162 selects a different one of bits 166 for the same input. In the example of FIG. 6, hash function 162A selects bit 166F when applied to packet header 154, hash function 162B selects bit 166C when applied to packet header 154, and hash function 162N selects bit 166H when applied to packet header 154.

When Bloom filter 160 applies each of hash functions 162 to packet header 154, Bloom filter 160 selects a subset of bits 166. When Bloom filter 160 is adding an element, Bloom filter 160 sets each of the subset of bits 166 to a value of "1," as is shown in FIG. 6. When Bloom filter 160 is determining whether an element is a member, i.e., whether the bit-vector signature of the packet flow is set to all ones within the Bloom filter's vector, Bloom filter 160 determines whether each of the subset of bits 166 has a value of "1." In the example of FIG. 6, packet header 154 is an element of Bloom filter 160. Therefore, a router forwards packet 150 via link 180B, because the router selects the output of hash function 172B when applied to packet header 154, i.e., link 180B.

Figure 7:
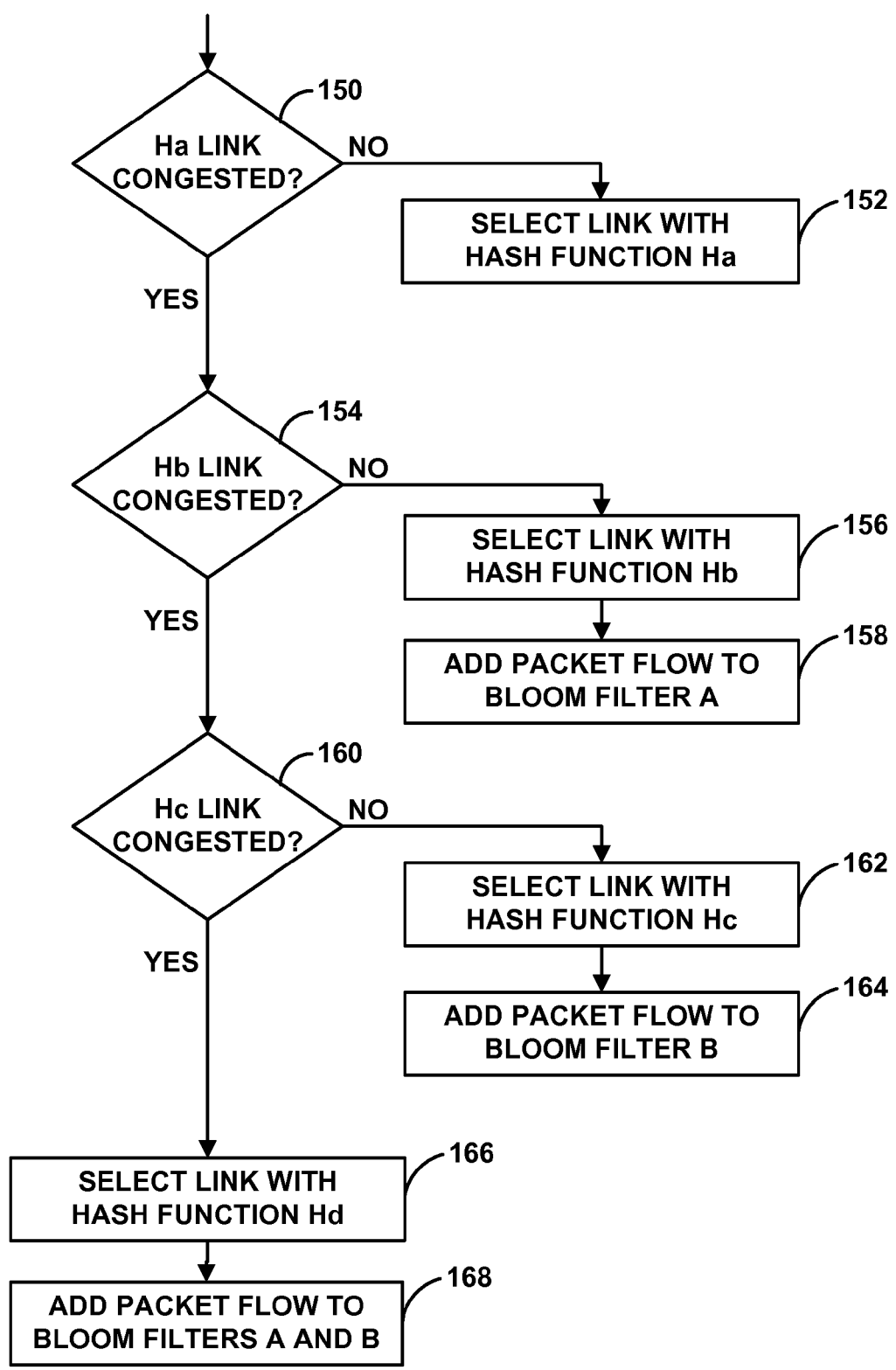
FIG. 7 is a flowchart illustrating an example method for selecting a link via which to forward a new packet flow when a router includes two Bloom filters and four hash functions.

FIG. 7 is a flowchart illustrating an example method for selecting a link via which to forward a new packet flow when a router includes two Bloom filters, designated Bloom filter A and Bloom filter B in FIG. 7. In the example of FIG. 7, the router also includes four hash functions, designated Ha, Hb, Hc, and Hd, for selecting one of a plurality of output interfaces via which to forward the new packet flow. The example method of FIG. 7 may be extended to accommodate any number of hash functions for selecting one of a plurality of output interfaces, where the router would include $\log_2$(number_of_hash_functions).

The example of FIG. 7 assumes that the router has already determined that a packet belongs to a new packet flow. The router determines whether a link selected by applying hash function Ha to the packet header is congested (150). If not, the router selects the link corresponding to the output of hash function Ha for forwarding the packet flow (152).

If the link corresponding to output of hash function Ha is congested, however, the router determines whether a link corresponding to the output of hash function Hb when applied to the packet header is congested (154). If not, the router selects the link corresponding to the output of hash function Hb for forwarding the packet flow (156). The router also adds the packet flow to Bloom filter A (158).

If the link corresponding to output of hash function Hb is also congested, the router determines whether a link corresponding to the output of hash function Hc when applied to the packet header is congested (160). If not, the router selects the link corresponding to the output of hash function Hc for forwarding the packet flow (162). The router also adds the packet flow to Bloom filter B (164).

If the link corresponding to output of hash function Hc is congested, the router selects the link corresponding to the output of hash function Hd for forwarding the packet flow (166). The router also adds the packet flow to both Bloom filter A and Bloom filter B (168).

Figure 8:
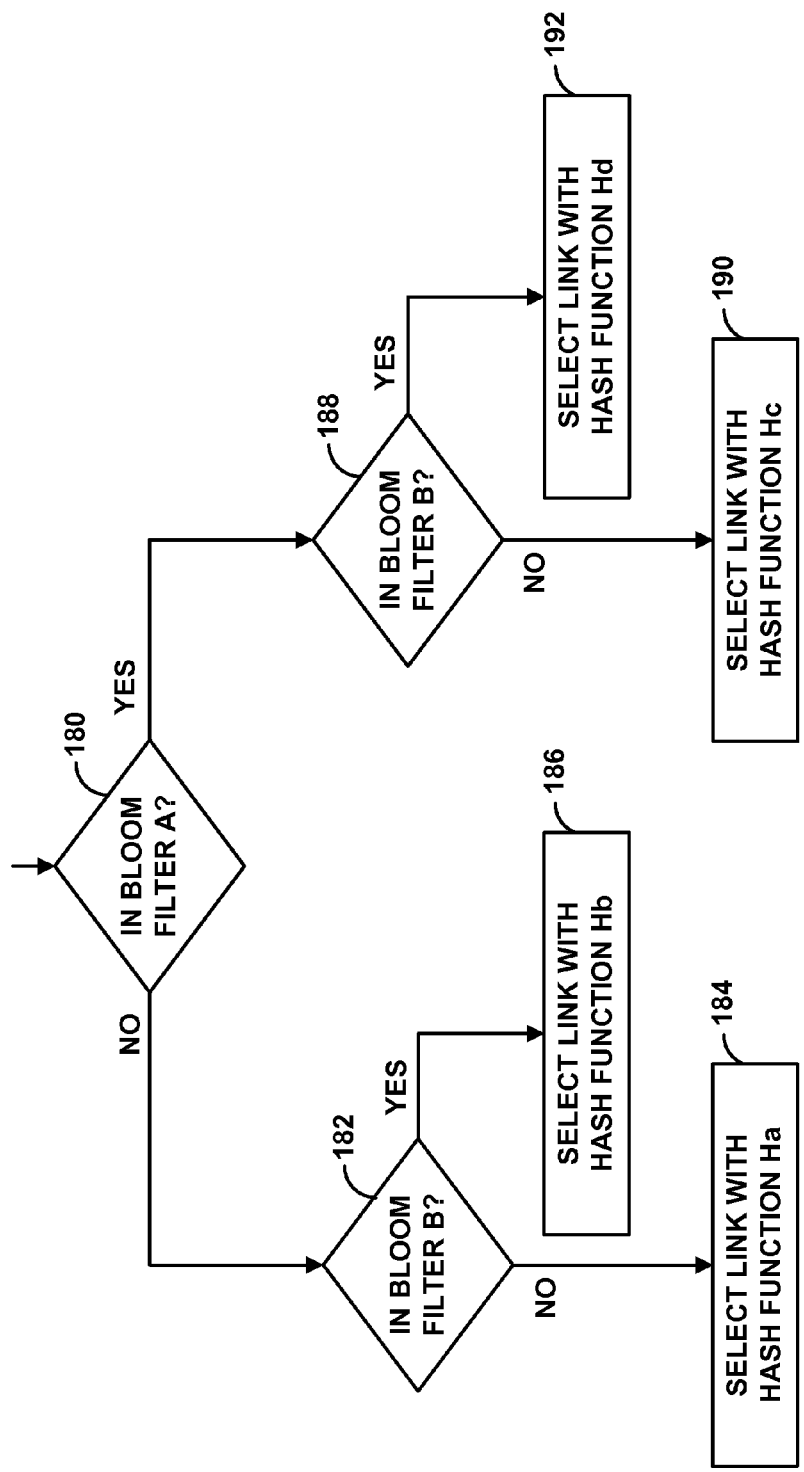
FIG. 8 is a flowchart illustrating an example method for selecting a link via which to forward a packet of an existing packet flow when a router includes two Bloom filters and four hash functions.

FIG. 8 is a flowchart illustrating an example method for selecting a link via which to forward a packet of an existing packet flow when a router includes two Bloom filters, designated Bloom filter A and Bloom filter B in FIG. 8. In the example of FIG. 8, the router also includes four hash functions, designated Ha, Hb, Hc, and Hd, for selecting one of a plurality of output interfaces via which to forward the packet of the existing packet flow. A router implementing the example method of FIG. 8 may implement a method similar to the example of FIG. 7 to select a link via which to forward packets of a new packet flow.

The router queries Bloom filter A to determine whether the packet flow is an element of Bloom filter A, i.e., whether the bit-vector signature of the packet flow is set to all ones within the Bloom filter's vector, indicating that a packet flow producing this bit vector signature has recently been seen before by the router and none of the bits have been cleared due to timer expiration (180). If not, the router queries Bloom filter B to determine whether the packet flow is an element of Bloom filter B (182). When the packet flow is not an element of Bloom filter A and not an element of Bloom filter B, the router selects the link corresponding to the output of hash function Ha for forwarding the packet of the packet flow (184). When the packet flow is not an element of Bloom filter A, but is an element of Bloom filter B, the router selects the link corresponding to the output of hash function Hb for forwarding the packet of the packet flow (184).

When the packet is an element of Bloom filter A, the router queries Bloom filter B to determine whether the packet flow is also an element of Bloom filter B (188). When the packet flow is an element of Bloom filter A and not an element of Bloom filter B, the router selects the link corresponding to the output of hash function Hc for forwarding the packet of the packet flow (190). When the packet flow is an element of both Bloom filter A and an element of Bloom filter B, the router selects the link corresponding to the output of hash function Hd for forwarding the packet of the packet flow (192).

Figure 9:
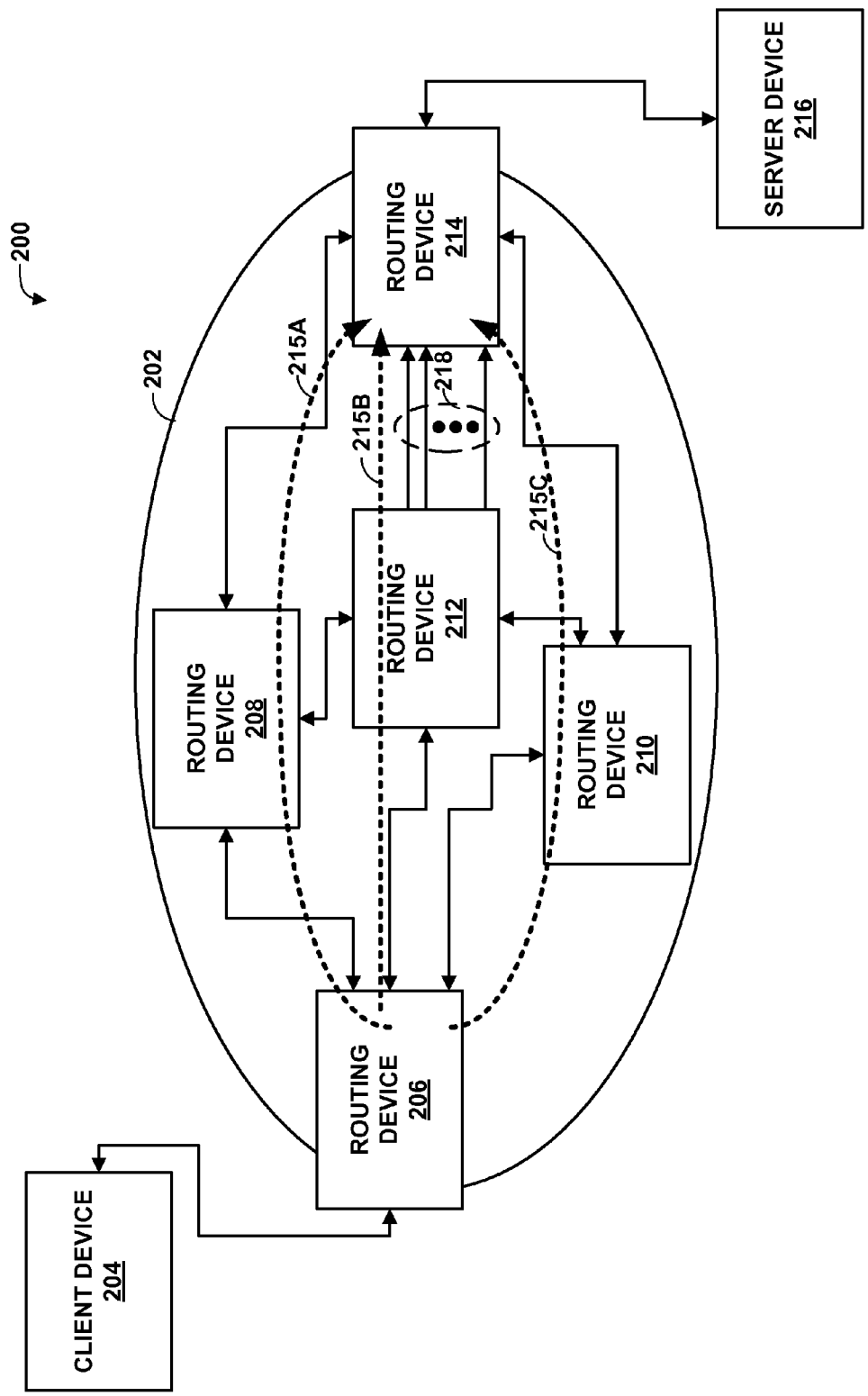
FIG. 9 is a block diagram illustrating an example system in which a routing device assigns new packet flows to a less congested one of a plurality of parallel data paths to reach a connected routing device.

FIG. 9 is a block diagram illustrating an example system 200 in which example routing device 212 assigns new packet flows to a less congested one of parallel data paths 218 to reach routing device 214. System 200 includes network 202, client device 204, and server device 216. In the example of FIG. 9, client device 204 may initiate a communication session with server device 216 by sending packets through network 202. Network 202 includes routing devices 206, 208, 210, 212, and 214. In the example of FIG. 9, routing device 212 includes a plurality of parallel data paths 218 that connect to routing device 214. In other examples, any or all of the devices of FIG. 9 may be connected by a plurality of parallel data paths. In addition, routing device 212 includes links that connect routing device 212 to routing devices 206, 208, and 210. Routing device 214 is also connected to routing devices 208 and 210 and to server device 216.

Client device 204 sends and receives data via routing device 206 of network 202. Routing device 206 determines one or more routes through network 202 that reach server device 216. For example, routing device 206 may determine a route including routing device 206, routing device 212, routing device 214, and concluding with server device 216. When routing device 206 receives a packet from client device 204 intended for server device 216, routing device 214 forwards the packet along the route to routing device 212.

Routing device 212 selects one of parallel data paths 218 to forward the packet to routing device 214. In one example, routing device 212 applies each of a first set of hash functions to a packet and one of a second set of hash functions, comprising a first hash function and a second hash function, to the packet, wherein each bin of each of the first set of hash functions is mapped to a bit of a bit vector, wherein each bin of each of the second set of hash functions is mapped to one of the plurality of parallel data paths 218. Routing device 212 also selects the one of the second set of hash functions to apply to the packet based on values of the bits of the bit vector, wherein routing device 212 forwards the packet through one of the plurality of parallel data paths 218 that is mapped to the bin of the selected one of the second set of hash functions when routing device 212 applies the selected one of the second set of hash functions to the packet to routing device 214. Upon receiving the packet from routing device 212, routing device 214 forwards the packet to server device 216.

Although routing device 212 is described as having parallel data paths for reaching routing device 214 in the example of FIG. 9, in other examples, any of the devices of FIG. 9 may include a plurality of parallel data paths. For example, routing device 206 may apply the techniques of this disclosure for forwarding packets of a packet flow conforming to a label switched path (LSP) through network 202. Routing device 206 may, for example, invoke a label distribution protocol, e.g., the Resource Reservation Protocol (RSVP-TE) or the Label Distribution Protocol (LDP) to establish a first LSP 215A through network 202 that includes routing device 206, routing device 208, and routing device 214, a second LSP 215B that includes routing device 206, routing device 212, and routing device 214, and a third LSP 215C that includes routing device 206, routing device 210, and routing device 214. Routing device 206 may then select one of the three LSPs 215 that is less congested and assign a new packet flow to the less congested LSP. Routing device 206 may then use a Bloom filter to identify one of a set of hash functions to apply to packets of existing packet flows, where routing device 206 applies the one of the set of hash functions to the packets of a particular packet flow to identify through which of the three LSPs 215 to forward the packets of the packet flow.

Figure 10:
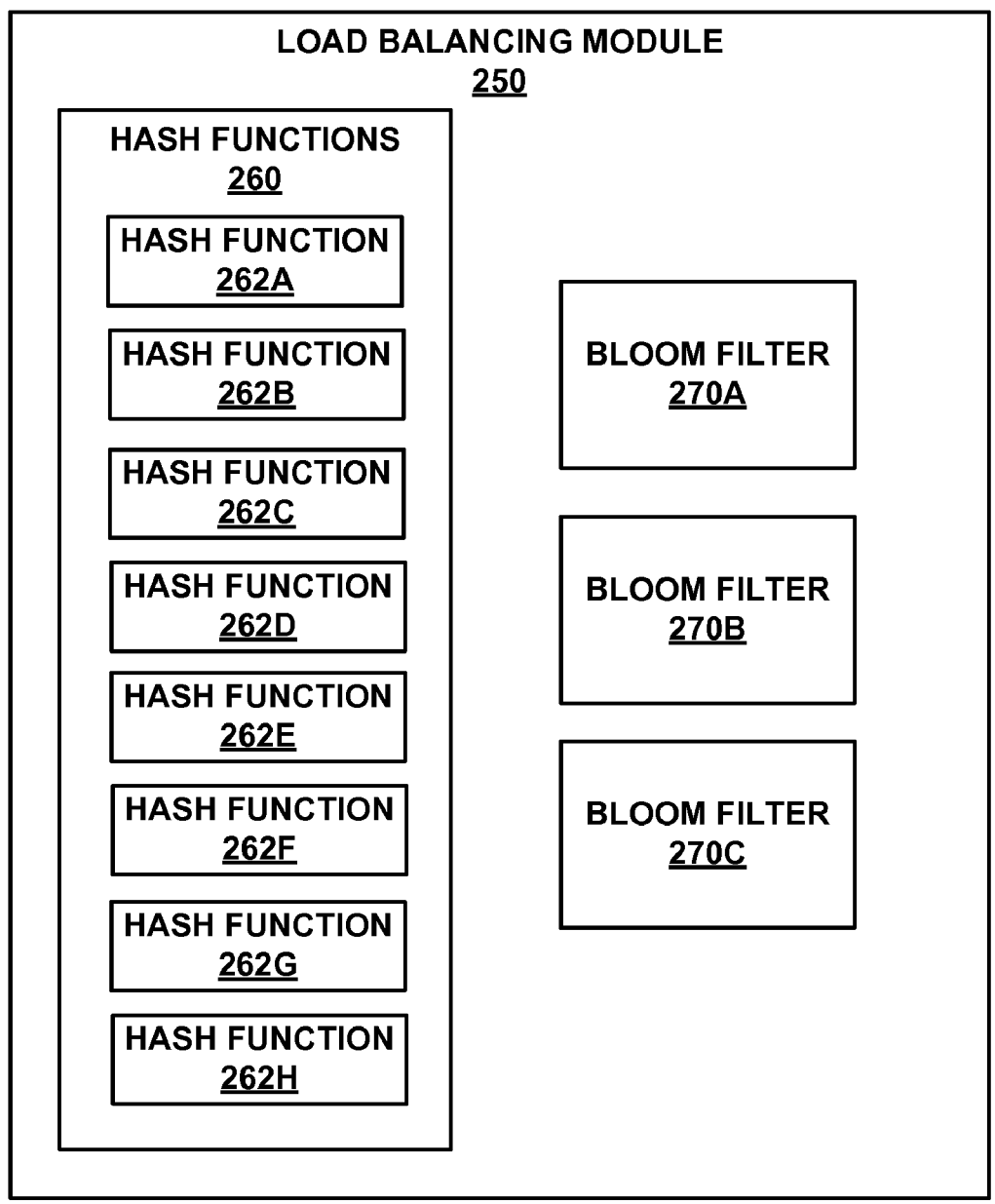
FIG. 10 is a block diagram illustrating an example load balancing module that includes a plurality of Bloom filters and a plurality of hash functions.

FIG. 10 is a block diagram illustrating an example load balancing module 250 that includes a plurality of Bloom filters 270A-270C (Bloom filters 270). Load balancing module 250 may correspond to load balancing module 34 (FIG. 2) in some examples. Load balancing module 250 also includes a plurality of hash functions 260, which includes hash functions 262A-262H in the example of FIG. 10. In general, for N hash functions 260, a load balancing module, such as load balancing module 250, requires $\log_2(N)$ Bloom filters.

Each of hash functions 260 may perform similar functions as hash functions 60 (FIG. 2). Load balancing module 250 applies hash functions 260 to a packet to identify an output interface, such as one of output links 54, for a packet flow of the packet. When the packet flow is a new packet flow, load balancing module 250 determines whether an output interface corresponding to output of a first one of hash functions 260, e.g., hash function 262A, when hash function 262A is applied to the packet, is a congested output interface, or whether the output interface is the most congested output interface of all of the available output interfaces. If not, load balancing module 250 selects the output interface as the interface through which to forward packets of the new packet flow.

If the output interface is congested (e.g., is most congested), load balancing module 250 applies a next one of hash functions 260, e.g., hash function 262B, to the packet to identify a second output interface. If the output interface is congested, or is the next most congested interface, load balancing module 250 may attempt to identify a different one of the output interfaces using another one of hash functions 260.

Load balancing module 250 uses Bloom filters 270 to determine which of hash functions 260 to apply to an existing packet flow. Load balancing module 250 adds a new packet flow to particular ones of Bloom filters 270 corresponding to the one of hash functions 260 to which the packet flow was assigned. For example, load balancing module 250 may add the new packet flow to none of Bloom filters 270 when the new packet flow is assigned to hash function 262A, load balancing module 250 may add the new packet flow to only Bloom filter 270C when the new packet flow is assigned to hash function 262B, load balancing module 250 may add the new packet flow to Bloom filters 270A and 270C when the new packet flow is assigned to hash function 262E, and load balancing module 250 may add the new packet flow to each of Bloom filters 270 when the new packet flow is assigned to hash function 262H. Load balancing module 250 may, for example, add the new packet flow to Bloom filters 270 according to the pattern of Table 2, described with respect to FIG. 1, above. Similarly, for existing packet flows, load balancing module 250 may query each of Bloom filters 270 to determine to which of hash functions 260 the existing packet flows were assigned. Load balancing module 250 may therefore apply the same one of hash functions 260 to all packets of a particular packet flow. In this manner, load balancing module 250 may assign a new packet flow to a less congested link and ensure that packets of a particular packet flow are delivered in order.

The techniques described herein may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described herein may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
   receiving, with a network device, a packet of a packet flow, wherein the network device is coupled to a plurality of parallel data paths;
   determining whether the packet is a request to establish a network connection;
   when the packet is a request to establish a network connection, querying a Bloom filter of the network device with packet flow information of the packet to determine whether the packet flow is a member of the Bloom filter;
   when the packet flow is not a member of the Bloom filter, selecting a first one of the plurality of parallel data paths with a first hash function and determining whether the first one of the parallel data paths is congested; and
   when the first one of the parallel data paths is congested, adding the packet flow to the Bloom filter, selecting a second one of the plurality of parallel data paths with a second hash function and forwarding the packet through the selected second one of the parallel data paths.

2. The method of claim 1, wherein determining whether the packet is a request to establish a network connection comprises determining whether the packet is a synchronization (SYN) packet.

3. The method of claim 1, wherein querying a Bloom filter to determine whether the packet flow is a member of the Bloom filter comprises querying the Bloom filter to determine whether application of the Bloom filter to the flow information of the packet produces a bit vector signature currently stored in the Bloom filter in response to one or more previous packet flows.

4. The method of claim 1, wherein querying a Bloom filter comprises:
   applying each of a set of Bloom filter hash functions to the flow information of the packet to select a subset of bits of a bit vector of the Bloom filter, wherein bins of the Bloom filter hash functions are mapped to the bits of the bit vector;
   when at least one of the selected subset of bits is not currently set, determining that the packet is not a member of the Bloom filter; and
   when each of the selected subset of bits is currently set, determining that the packet is a member of the Bloom filter.

5. The method of claim 1, wherein selecting the first one of the plurality of parallel data paths with a first hash function comprises executing the first hash function on a portion of the packet.

6. The method of claim 5, wherein executing the first hash function on a portion of the packet comprises executing the first hash function on a packet header of the packet.

7. The method of claim 1, wherein adding the packet flow to the Bloom filter comprises:
   applying each of a set of Bloom filter hash functions to the flow information of the packet to select a subset of bits of a bit vector of the Bloom filter, wherein bins of the Bloom filter hash functions are mapped to the bits of the bit vector; and
   setting each of the selected subset of bits of the bit vector to a value of 1.

8. The method of claim 1, wherein when the first one of the parallel data paths selected with the first hash function is not congested, the method further comprises forwarding the packet through the selected first one of the parallel data paths.

9. The method of claim 1, wherein when the packet is a request to establish a network connection and when the packet is a member of the Bloom filter, the method further comprises:
   selecting a third one of the plurality of parallel data paths with the second hash function; and
   forwarding the packet through the selected third one of the parallel data paths.

10. The method of claim 1, wherein when the packet is not a request to establish a network connection, the method further comprises querying the Bloom filter with the packet to determine whether the packet is a member of the Bloom filter.

11. The method of claim 10, wherein when the packet is not a request to establish a network connection and the packet is not a member of the Bloom filter, the method further comprises:
   selecting the first one of the plurality of parallel data paths with the first hash function; and
   forwarding the packet through the selected first one of the parallel data paths.

12. The method of claim 10, wherein when the packet is not a request to establish a network connection and the packet is a member of the Bloom filter, the method further comprises:
   selecting the second one of the plurality of parallel data paths with the second hash function; and
   forwarding the packet through the selected second one of the parallel data paths.

13. A network device comprising:
   an input network interface that receives a packet of a packet flow;
   a plurality of parallel output network interfaces;
   a link monitoring module that identifies each of the plurality of parallel output network interfaces that is congested;
   a Bloom filter that stores bit vector signatures of packet flows and determines whether a bit vector signature for a queried packet matches one of the stored bit vector signatures;
   a load balancing module that selects one of the plurality of parallel output network interfaces for the packet flow, wherein the load balancing module queries the Bloom filter to select one of a plurality of hash functions to apply to the packet, wherein the load balancing module applies the selected hash function to the packet to select the one of the plurality of parallel output network interfaces, and wherein the load balancing module queries the link monitoring module to determine whether the selected parallel output network interface is congested for packets that are requests to establish a network connection, wherein when the packet is a request to establish a network connection, the load balancing module queries the Bloom filter to determine whether a bit vector signature for the packet matches one of the stored bit vector signatures, wherein when the bit vector signature for the packet does not match one of the stored bit vector signatures the Bloom filter, the load balancing module executes a first hash function to select a first one of the plurality of parallel output network interfaces and queries the link monitoring module to determine whether the first one of the parallel data paths selected with the first hash function is congested, and wherein when the link monitoring module determines that the first one of the parallel output network interfaces is congested, the load balancing module adds the packet flow to the Bloom filter and executes a second hash function on the packet to select a second one of the plurality of parallel output network interfaces; and a control unit that determines whether the packet is a request to establish a network connection and that forwards the packet along the selected one of the plurality of parallel output network interfaces.

14. The network device of claim 13, wherein the Bloom filter stores a bit vector signature for the packet.

15. The network device of claim 13, wherein when the link monitoring module determines that the first one of the parallel output network interfaces selected with the first hash function is not congested, the control unit forwards the packet through the first one of the parallel output network interfaces.

16. The network device of claim 13, wherein when the bit vector signature for the packet matches one of the stored bit vector signatures, the load balancing module applies a second hash function to select a second one of the plurality of parallel output network interface, and wherein the control unit forwards the packet through the second one of the plurality of parallel output network interfaces.

17. The network device of claim 13, wherein when the packet is not a request to establish a network connection, the load balancing module queries the Bloom filter to determine whether a bit vector signature for the packet matches one of the stored bit vector signatures of the Bloom filter, wherein when the bit vector signature for the packet does not match one of the stored bit vector signatures, the load balancing module executes a first hash function to select a first one of the plurality of parallel output network interfaces, but when the bit vector signature for the packet matches one of the stored bit vector signatures, the load balancing module executes a second hash function to select a second one of the plurality of parallel output network interfaces and queries the link monitoring module to determine whether the second one of the parallel data paths is congested.

18. The network device of claim 13, wherein the Bloom filter comprises a set of Bloom filter hash functions and a bit vector, wherein bins of each of the Bloom filter hash functions are mapped to bits of the bit vector.

19. The network device of claim 18, further comprising a timer that determines at least one of the bits of the bit vector that is a least recently used bit, wherein the control unit clears the least recently used bit when the timer expires.

20. A non-transitory computer-readable medium comprising instructions for causing a programmable processor of a network device comprising a plurality of parallel data paths to:

receive a packet of a packet flow;

determine whether the packet is a request to establish a network connection;

when the packet is a request to establish a network connection, query a Bloom filter with the packet to determine whether a bit vector signature of the packet matches one of a plurality of bit vector signatures stored by the Bloom filter;

when the bit vector signature matches one of the plurality of bit vector signatures stored by the Bloom filter, select a first one of the plurality of parallel data paths with a first hash function and forward the packet through the selected first one of the plurality of parallel data paths;

when the bit vector signature does not match one of the plurality of bit vector signatures stored by the Bloom filter, select a second one of the plurality of parallel data paths with a second hash function and determine whether the selected second one of the parallel data paths is congested;

when the selected second one of the parallel data paths is not congested, forward the packet through the selected second one of the parallel data paths;

when the selected second one of the parallel data paths is congested, store the bit vector signature of the packet with the Bloom filter to add the packet flow to the Bloom filter, select the first one of the parallel data paths with the first hash function, and forward the packet through the selected first one of the parallel data paths; and when the packet is not a request to establish a network connection, query the Bloom filter with the packet to determine whether a bit vector signature of the packet matches one of a plurality of bit vector signatures stored by the Bloom filter;

when the bit vector signature matches one of the plurality of bit vector signatures stored by the Bloom filter, select the first one of the plurality of parallel data paths with the first hash function and forward the packet through the selected first one of the parallel data paths; and when the bit vector signature does not match one of the plurality of bit vector signatures stored by the Bloom filter, select the second one of the plurality of parallel data paths with a second hash function and forward the packet through the selected second one of the parallel data paths.

* * * * *